United States Patent [19]

Shiah

[11] 4,085,190

[45] Apr. 18, 1978

[54] PRODUCTION OF RUTILE FROM ILMENITE

[76] Inventor: Chyn Duog Shiah, 189 Nassau Ave., Manhasset, L. I., N.Y. 11030

[21] Appl. No.: 572,938

[22] Filed: Apr. 29, 1975

[51] Int. Cl.² .............................................. C01G 23/04
[52] U.S. Cl. ........................................ 423/80; 423/84; 423/86; 423/83; 423/612
[58] Field of Search ................... 423/80, 84, 86, 150, 423/85, 242, 612, 615, 83; 75/1 T, 32, 94

[56] References Cited

U.S. PATENT DOCUMENTS

| | | | |
|---|---|---|---|
| 1,155,462 | 10/1915 | Barton | 423/615 |
| 2,080,779 | 5/1937 | Lessing | 423/242 |
| 3,071,435 | 1/1963 | Kudsen | 423/85 |
| 3,112,178 | 11/1963 | Judd | 423/86 |
| 3,252,787 | 5/1966 | Shioh | 423/633 |
| 3,457,037 | 7/1969 | Aramendia et al. | 423/86 |
| 3,556,722 | 1/1971 | Owaki | 423/242 |
| 3,816,099 | 6/1974 | Stewart et al. | 75/1 T |

FOREIGN PATENT DOCUMENTS

| | | | |
|---|---|---|---|
| 108,693 | 8/1917 | United Kingdom | 423/611 |
| 881,808 | 11/1961 | United Kingdom | 423/80 |

OTHER PUBLICATIONS

Chem. Abstracts, vol. 52, #20947a, (1958).

*Primary Examiner*—O. R. Vertiz
*Assistant Examiner*—Brian E. Hearn
*Attorney, Agent, or Firm*—Robert E. Burns; Emmanuel J. Lobato; Bruce L. Adams

[57] ABSTRACT

A catalytic ilmenite reduction procedure is described which provides a magnetic fraction consisting of the iron and titanium values of the ilmenite ores and a non-magnetic gangue. The magnetic fraction, after solubilization of the reduced iron, provides beneficiated Rutile-type titania product with purity ranges from 80 to 95% depending on the grade of ilmenite starting material. The titanias are further purified by sulfation and a metathetical reaction to convert the titanyl sulfates to chlorides by $CaCl_2$.

1 Claim, 4 Drawing Figures

PRODUCTION OF RUTILE FROM ILMENITE

FIELD OF THE INVENTION

This invention relates to the production of titanium dioxide and more particularly to the production of rutile-type $TiO_2$ from ilmenite sources.

BACKGROUND OF THE INVENTION

Rutile is a naturally occuring substantially pure $TiO_2$, but ilmenite is the most wide spread and cheapest titanium-containing ore. Ilmenite is classically ferrous titanite, $FeO.TiO_2$ or $FeTiO_3$. In the natural state, the ilmenite is often associated with greater quantities of iron oxide and varying amounts of other impurities such as the oxides and sulphides of magnesium, aluminum, manganese and often trace amounts of vanadium and chromium. Silica is also a naturally occurring diluent of the ilmenite.

Commercially, ilmenite ores may be classified as high grade ores or low grade ores. The high grade ilmenite ores contain up to 50 wt % of $TiO_2$-equivalent and less than 30 wt % of total iron, as iron oxides. The low grade ilmenite ores generally have $TiO_2$-equivalent contents of less than 50 wt % and iron contents in excess of 30 wt % iron as the oxides. Some of the iron in the low grade ores, may be in the form of sulphides. The amount of other contaminating and diluting oxides is also greater in the low grade-ilmenite ores.

In the past, ilmenite has commercially been converted to $TiO_2$ via the sulphate process. High grade ilmenites are dissolved in concentrated sulphuric acid and first hydrolyzed to titanium oxide hydrates and then these hydrates are calcined to the anatase form of $TiO_2$. As anatase is the less preferred form of $TiO_2$ for pigment production (its greatest commercial use) it must subsequently be transformed to the rutile form of $TiO_2$.

It is desirable to obtain $TiO_2$ directly in the rutile form. It is recognized in the industry that $TiO_2$, in rutile form, is best obtained via the "chloride" process wherein titania from crude natural or synthetic rutile is chlorinated to form $TiCl_4$ in pure form. The latter is then oxidized or burnt directly to form the rutile-$TiO_2$. The $TiCl_4$ can also be hydrolyzed and then calcined to yield the rutile-$TiO_2$.

Applicants are also the inventors of related processes for the manufacture of synthetic rutiles from ilmenite as set forth in U.S. Pat. Nos. 3,252,787 and in U.S. Patent application Ser. No. 284,541 filed Aug. 29, 1972 now U.S. Pat. No. 3,929,962.

In the first of these, the iron content of the ilmenite is first oxidized and then reduced to metallic iron. The metallic iron is then leached from the $TiO_2$ residues by solution in ferric chloride solution. As taught in that patent, in order for the reduction to metallic iron be readily accomplished, it is preferred to initially convert, by oxidation, the ferrous iron in the ilmenite to ferric iron prior oxidation step. It is required by that process that reduction be carried out at temperatures between about 750° to 1250° C and preferably about 900° C.

The second invention, is based upon an improved yield with reduced magnesium impurities that results when small amounts of HF or fluorides are included in the hydrochloric acid solutions used to extract and dissolve the iron-free reduced ilmenite for the chloride process.

The processes described in these inventions are based upon integrated procedures utilizing high grade ilmenite or synthetic rutile as starting materials.

OBJECTIONS OF THE INVENTION

It is an object of this invention to provide a method for the production of a synthetic rutile of more than 95 wt % $TiO_2$-content from high grade ilmenite ores.

It is a further object of this invention to provide a method for the beneficiation of low grade ilmenite ores having $TiO_2$ contents of less than 50 wt % to superior materials with $TiO_2$-contents of about 80 wt %.

According to another aspect of this invention, there is provided a method for the direct conversion of titanyl sulphates from the sulphate extraction process to rutile percursors of the titanium tetrachloride type via a novel replacement reaction. Such precursors can be converted to pigment grade $TiO_2$ of 98% + purity.

It is another object of this invention to provide an integrated process for the production of rutile $TiO_2$ from two types of starting materials, high grade ilmenite and low grade ilmenite wherein the by-product materials resulting from treating each starting material is transferred and utilized in the processing of the other starting material whereby significant economies are obtained, pigment-grade rutile $TiO_2$ is produced and any residues are discharged from the process in ecologically acceptable form thus causing minimal damage or inbalance to the environment.

THE INVENTION

Previously, it was necessary, in order to beneficiate ilmenite to smelt the ilmenite, ores or to subject them to reduction reactions at temperatures of about 2000° F in order to achieve reduction within economically feasible times. The present invention in one aspect is based upon the discovery of a catalyst with which it is possible to reduce substantially all of the iron content in the ilmenite to metallic iron at temperatures in the range of 1300° - 1800° F within 5 hours. This catalyst is calcium sulphate ($CaSo_4$). Further, by use of this catalyst, it is possible to then magnetically separate the product of the reduction into a magnetic fraction and a non-magnetic fraction. The magnetic fraction, separated by its diversion and/or attraction via magnetic separation means, in addition to containing the metallic iron also includes substantially all of the $TiO_2$ content of the reduced ore. The non-magnetic fraction, from the separation, contains calcium sulphide, (CaS), reduced from the $CaSO_4$ and most of the contaminating oxides such as $Al_2O_3$, MgO, etc. which are not attracted to the magnetic separation means and are also difficult to reduce to the metallic state at these low temperatures. Some of this gangue may also be in the form of sulphides.

According to another aspect of this invention, low grade ilmenite ores, containing less than 50 wt % of $TiO_2$ equivalent and more than 30 wt % of iron, can be beneficiated directly by the catalytic reduction and magnetic separation to remove the unwanted gangue. After the magnetic separation of the metallic iron and adherent $TiO_2$, from the gangue, the metallic iron is removed by leaching the magnetic fraction with a ferric chloride solution leaving a beneficiated titanium product having a $TiO_2$ content in excess of 70% which can then be economically utilized in either the sulphuric acid or chloride process.

The beneficiated $TiO_2$ product, after the leaching operation, can then also be utilized in another aspect of this invention, in the specially designed process compatible with the overall scheme of the present invention, whereby the beneficiated titania products are dissolved and extracted with concentrated sulphuric acid. The dissolved titania forms a titanyl sulphate which is soluble in the $H_2SO_4$ and leaves any silica as an insoluble residue. The titanyl sulphate, treated according to this aspect of the invention, is directly reacted with a calcium chloride solution.

The sulphate from the $H_2SO_4$ and titanyl sulphate is precipitated as calcium sulphate and the titanium is substantially converted to titanium chloride which remain in solution. The precipitated calcium sulphate is filtered from the dissolved titanium chlorides. The titanyl chlorides thus obtained are primarily titanium tetrachloride ($TiCl_4$). This $TiCl_4$ solution can then be directly hydrolyzed to yield titanium oxide hydrates which, when calcined, form rutile-$TiO_2$. Titanium oxide hydrates derived from the titanium tetrachlorides tend to crystallize in the rutile form.

According to another aspect of this invention, an integrated process is provided making use of both the synergistic catalytic effect of calcium sulphate on ilmenite and the replacement reaction of calcium chloride upon titanyl sulphates in order to provide an integrated process using, as separate starting materials, both low grade ilmenite and high grade ilmenite. This process is completely integrated inasmuch as by-products from one procedure of the process are used in other procedures of the process. One set of procedures consists of preparing a mixture of high grade ilmenite with calcium sulphate. The mixture is then catalytically reduced by reducing agents and the reduced mixture is magnetically separated. The iron oxide component of the ilmenite is reduced substantially quantitatively to metallic iron and the calcium sulphate is substantially quantitatively converted to calcium sulphide. The reduction step of the iron oxides in the ilmenite is accomplished at lower than conventional temperatures by and because of the calcium sulphate catalyst. Further, the reduction step provides a mixture which upon magnetic separation provides a magnetic portion or fraction consisting of metallic iron and titanium oxides an a non-magnetic gangue portion containing the calcium sulphide and contaminating materials commonly found in ilmenite.

The magnetic separation can be performed on any of the commercially available magnetic separators used for ore dressing.

The separated magnetic fraction is then leached with a ferric chloride solution. All the metallic iron is thereby removed leaving a residue of a synthetic rutile containing about 95% $TiO_2$ from high grade ores. This provides a commercial source for rutile $TiO_2$ of such purity for use where absolute whiteness of the higher purities is not essential. 80% of $TiO_2$ is utilized in such purity.

The non-magnetic fraction, comprising primarily calcium sulphides with the other oxides impurities, is then treated with hydrochloric acid. This treatment produces hydrogen sulphide gas and a calcium chloride solution. The HCl-insoluble impurities (the other oxides) are filtered from the solution. The hydrogen sulphide gas can be converted either into high purity elemental sulphur or to sulphuric acid by conventional processes.

The low-grade ilmenite starting material which is generally obtained either from massive ilmenite deposits or as a by-product from the refining of hematite ores is upgraded in the conventional manner. Such upgraded ores however still contain significant amounts of gangue material such as magnesia and silica. Such ilmenites cannot be economically directly processed to titanium dioxide. According to the integrated process aspect of the invention, the reduction of the low quality ilmenite may be achieved without the admixture of calcium sulphate although some calcium sulphate may be utilized. After the reduction, magnetic separation is used to fractionate this reduced low grade ilmenite into a gangue and a magnetic portion. The magnetic portion consists of a beneficiated product containing primarily metallic iron and titanium dioxide. The iron is leached with ferric chloride solution. The $TiO_2$-containing residue is then reacted with concentrated sulphuric acid in which the $TiO_2$ dissolves. After removing the silica residue, the sulphuric acid-dissolved product, titanyl sulfate, $Ti(SO_4)_2$ is reacted with a calcium chloride solution. This latter is produced from the hydrochloric acid treatment of the calcium sulphide as mentioned above with regard to the residues on the high grade ilmenite ores. The $CaCl_2$ treatment of the $Ti(SO_4)_2$ forms a precipitate of $CaSO_4$. Upon filtration to remove the precipitated calcium sulphate, the filtrate contains a solution of titanium chlorides, primarily titanium tetrachloride and other soluble titanium chlorides. The filtrate is then concentrated and hydrolyzed, with heating, by conventional methods to form rutile-type titanium hydroxide.

This titanium hydroxide can then be further processed by conventional means such as roasting to form a pigment grade of titanium dioxide or it can be sold directly as a titanium hydroxide slurry. The hydrochloric acid resulting from the hydrolysis and concentration reactions is recovered by absorption. The small liquid stream of the concentrated solution of the chlorides of calcium and magnesium, which is the residue after the hydrochloric acid and titanium dioxide are removed, may then be directly disposed into the ocean without causing any pollution as such chlorides are regular components of sea water.

As can thus be seen from the above, this integrated process provides, as final products, rutile type-titanium dioxides, ferric oxide (derived from the ferric chloride solutions by oxidation as per U.S. Pat. No. 3,252,787) and the small amounts of soluble calcium and magnesium chlorides to be discharged into the sea water and a solid residue of silica or sand.

The synthetic 98% purity rutile-$TiO_2$ so produced is an excellent raw material for the manufacture of titanium tetrachloride for titanium metal, for titanium dioxide pigments and for titania pigments. It is also sufficiently pure to provide a starting source for titanium chlorides for utilization in the production of catalysts such as those of the Ziegler-Natta type used in the production of polyolefins. This synthetic rutile can also be used as a substitute wherever natural rutile of pigment grade is now generally used.

The beneficiated ilmenite product derived from the low grade ores by reduction and ferric chloride leaching, although its titanium dioxide content is only about 80 wt %, is not of sufficient purity to be commercially comparable to rutile. However it nevertheless finds many industrial applications particularly as a flux component in the porcelain industry or in the manufacture of welding rods and powders.

DETAILED DESCRIPTION OF THE INVENTION

The invention will be described in detail in conjunction with the drawings in which.

Certain of the products from the low grade ilmenite ore procedures are also utilized in the conversion of the high grade ilmenite.

In conjunction with the specific description of the above processes, the following terms are herewith defined:

The term "reducing agents" as used herein encompass the preferred, hydrogen and includes other reducing agents commonly used for ilmenite treatment such as carbon, carbon monoxide, methane, natural gases including the saturated and unsaturated hydrocarbons.

The reduction of the ilmenite with such reducing agents normally will take place at temperatures of 1500° to 2000° F after about 5 – 12 hours of heating. However, when calcium sulfate, $CaSO_4$ is admixed with the ilmenite, a catalytic and synergistic reduction is initiated and completed at substantially lower temperatures i.e. between about 1300° to 1800° F.

The reduction time is determined by the activity of the reducing agent and the reduction temperature. Hydrogen is the most active in the pesence of $CaSO_4$. At temperatures between 1500° and 1800° F the reduction is completed within minutes. With coal (carbon) and/or carbon monoxide, in the presence of the calcium sulfate catalyst, the reduction at the lower temperatures of the reduction range may take up to 5 hours but is substantially completed in less than an hour at the higher temperatures.

In the absence of the catalyst, at the lower temperatures of the above range i.e. 1300° F, the reaction is scarcely initiated within 8 hours.

The synergizing catalyst, $CaSO_4$, which preferably is used in the anhydrous form, although the use of its hydrates is not precluded, is preferably used in a molecular 1:1 ratio to the ilmenite. It will exert catalytic effects in weight ratios of 1:10 to 10:1. At least 10 wt % of $CaSO_4$ catalyst appears useful to significantly lower the reduction temperatures and increase the reduction rate.

The reduced ilmenite forms a mixture which can be physically separated by conventional magnetic means into a magnetic and a non-magnetic fraction.

The magnetic fraction appears to contain all of the iron and substantially all of the titanium values that were present in the ilmenite. The iron is almost quantitatively reduced by the reduction step to metallic iron.

The titanium values being freed from the iron oxides of the ilmenite appear to be in a form of a titania ($TiO_2$) which is strongly adherent to the metallic iron. The adherence appears to be due to the close disposition within the original ilmenite crystal of the iron oxides and titanium oxides before reduction. Upon reduction, of the iron, it is believed that the proximity of the materials is maintained. Other explanations include possible surface phenomena such as wetting and/or sintering.

The non-magnetic fraction contains calcium sulfide (CaS) which has been formed by the reduction of the Calcium Sulfate. $CaSO_4 + 4H_2 \rightarrow CaS + 4H_2O$. The sulfides and some unreduced oxides of metals normally associated with ilmenite are also to be found in this non-magnetic fraction. These include Mg, Al, Sn, Vn, Cr, Mn, Si and some Ti oxides and sulfides.

The iron in the magnetic fraction is leached from its association with the titania by the action of $FeCl_3$ solution. This reagent dissolves the iron by the reaction:

$$2Fe + 4FeCl_3 \rightarrow 6 FeCl_2$$

This reaction proceed quantitatively and rapidly at temperatures from room temperatures to the boiling point of the iron chloride solutions. The reaction is exothermic and maintains itself. Any excess heat can be removed via heat exchangers to other locales for use. The $FeCl_3$ solution should contain at least 3% Fe as $FeCl_3$ leaching. However, it is preferred to leach with solutions containing 8 to 15% Fe as $FeCl_3$. More concentrated solutions of $FeCl_3$ are also useful.

The insoluble residue from the leaching stage, after washing to remove any adherent iron chloride, is a substantially pure titania, $TiO_2$, and as a result of the heating during the reduction is in rutile form.

Titania, $TiO_2$, can occur in two crystalline forms, rutile, a tetragonal, uniaxial, optically-positive form and anatase, also tetragonal and uniaxial but optically-negative. Rutile is thermally stable and is preferred commercially as it has superior pigment properties due to its significantly higher refractive index over the visible spectrum. When heated, anatase crystals transform to rutile form. It has also been noted that the anatase-$TiO_2$ is formed from titanium hydrates resulting from the "sulfate" process whereas rutile-$TiO_2$ forms from hydrates prepared by the "chloride" or "halogen" process.

The non-magnetic fraction containing the calcium sulfide (CaS) is treated with hydrochloric acid (HCl) to form calcium chloride ($CaCl_2$) solutions and to drive off the gaseous hydrogen sulfide ($H_2S$) which forms. The $H_2S$ is collected and burnt with air to form elemental sulfur (S) by conventional means or further oxidized to sulfuric acid ($H_2SO_4$). The dissolved $CaCl_2$ is recovered for commercial use or in solution form to be utilized in the metathetical reaction described below with titanyl sulfate.

The insolubles remaining after the HCl treatment of the CaS are removed by filtration of the $CaCl_2$ solution and consist of the insoluble oxides, sulfides and chlorides of the ilmenite impurities mentioned above. These form a gangue which can be discarded.

The $FeCl_2$, containing the leached iron, from the ilmenite is oxidized, preferably with oxygen, to regenerate the $FeCl_3$ solution and to precipitate out the excess iron as pure high-grade hydrated iron oxide. This oxidation and precipitation treatment of the iron chloride solutions has been described in greater detail in the aforementioned patent U.S. Pat. No. 3,252,787 and patent application. The precipitated hydrated iron oxide is of premium grade suitable for pigment and "ferrite" uses.

When the TiO$_2$ product recovered after the FeCl$_3$ leaching is desired to be of higher purity, it may be sulfated by solution in H$_2$SO$_4$ to form titanyl sulfate Ti(SO$_4$)$_2$ solutions. Any insoluble residue comprises silica, (SiO$_2$) impurities. These titanyl sulfate solutions may be treated in accordance with the conventional "sulfate" process or preferably according to the novel procedure described below as another aspect of this invention.

The titanyl sulfate solutions according to this feature of the invention are admixed and reacted with equivalent amounts of concentrated calcium chloride solutions. A metathetical reaction takes place as follows:

$$Ti(SO_4)_2 + CaCl_2 \rightarrow TiCl_4 + 2\,CaSO_4 \downarrow$$

The above equation is an approximation of the reaction which takes place as the structures of the titanyl sulfate and the resulting titanium chlorides are more complex. However CaSO$_4$ precipitates and the titanium, as the chlorides, remains in solution and is recovered by filtration. The titanium chlorides are then hydrolyzed by the procedures conventionally used in the "chloride" titania process to yield rutile type-titania slurries. The latter are commercially used in the porcelain industry or the titania hydrates are roasted to form rutile type-TiO$_2$ in very pure form.

As mentioned above, the CaCl$_2$ used as the reactant in the metathetical reaction is obtained from the HCl treatment of the CaS recovered from the non-magnetic fraction. The precipitated CaSO$_4$ from the metathetical reaction, after drying, when admixed with the ilmenite serves as the catalyst for the initial reduction treatment of ilmenite prior to the magnetic separation.

The sulfuric acid can be obtained from the oxidation of the H$_2$S recovered from preparation of the CaCl$_2$ solutions from the CaS. The HCl is recovered from the hydrolysis step used for converting the titanium chlorides to the titania hydrates. (Ti(OH)$_4$)

From the above, it is seen that the procedures utilizing the catalytic and synergistic effects of CaSO$_4$ on the reduction stage, prior to the novel magnetic separation and FeCl$_3$ leaching, when combined with the metathetical conversion of titanyl sulfates to chlorides via calcium chloride, lead to a substantially self-contained integrated procedure for the beneficiation and/or purification of ilmenite to rutile-type titanium dioxide.

The various aspects of the invention will now be described by reference to the aforementioned drawings. The same numbers reflect like procedures, steps and reactions as used in the various aspects of this novel process. It will be understood that the descriptions herein above and below reflect the preferred modes for practicing the various aspects of the invention but are merely exemplary of such modes. All disclosed and art-recognized equivalents as to conditions, procedures and reactants are intended for substitution as within the scope of the practice of this invention.

EXAMPLE 1

Figure 1:
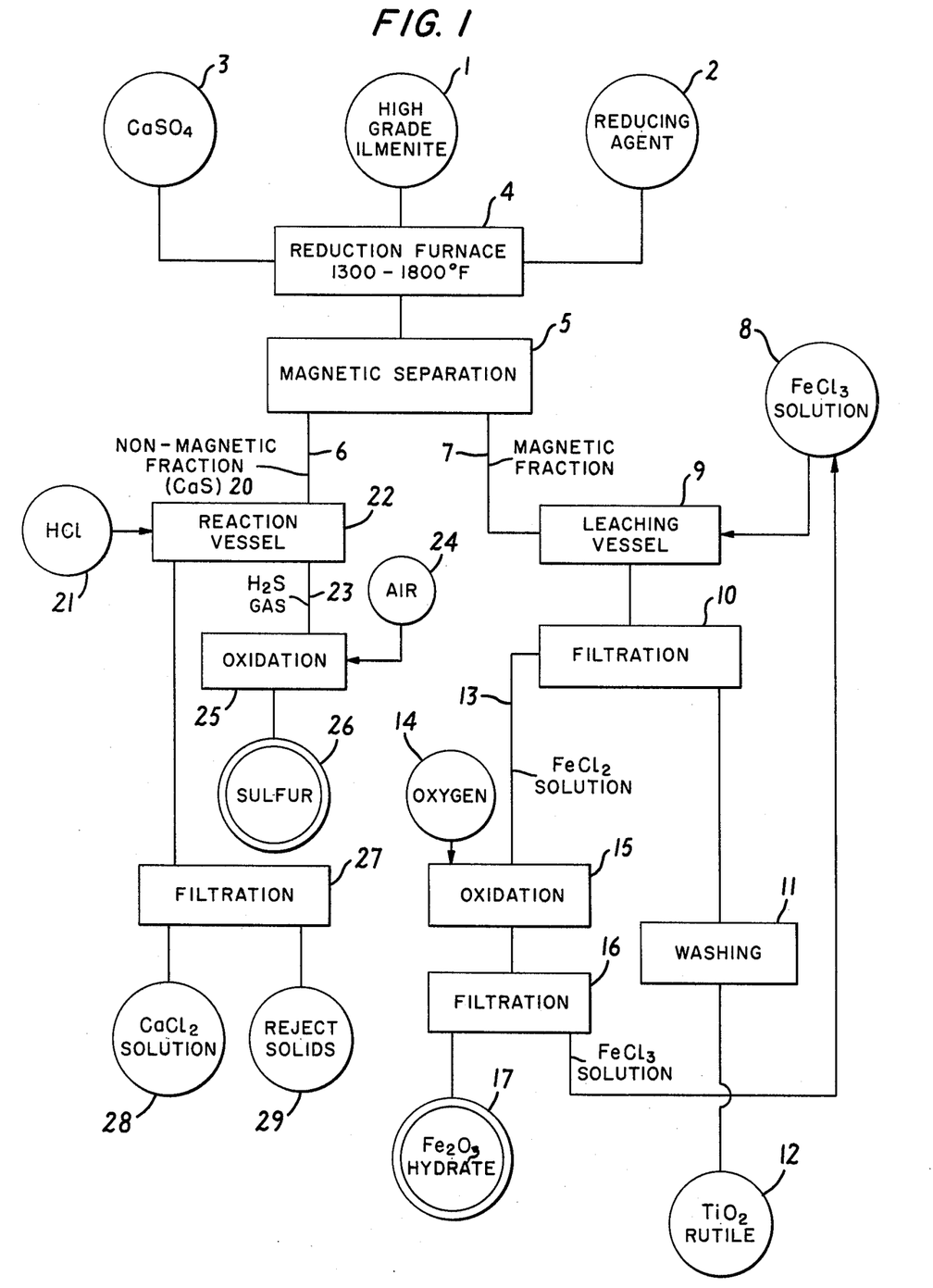
FIG. 1 is a flow sheet of that aspect of the invention showing the purification of high grade ilmenite ores to yield a high grade rutile-type $TiO_2$, with iron oxide hydrate, ferrite grade) as a by-product.

FIG. 1 is directed to that aspect of the invention wherein a high grade ilmenite ore, containing up to about 50 wt % of titanium TiO$_2$ equivalent and less than 30 wt percent of total iron as iron oxides, is reduced in the presence of calcium sulfate. High grade ilmenite 1 is admixed with an equal amount of calcium sulfate 3. The mixture is heated in a furnace 4 and hydrogen gas 2 introduced therein. After completion of the reduction and passage of the reduced mixture from the furnace 4, the reduced mixture is cooled and subjected to magnetic separation 5. Conventional commercial magnetic separation means may be used including endless belts or non-magnetic link chains. The separation yields non-magnetic fraction 6 and magnetic fraction 7. Magnetic fraction 7 is introduced into leaching vessel 9 and treated therein with ferric chloride solution 8. Ferric chloride solution 8 should contain preferably between 8 and 15 percent, optimally about 10 percent iron content as ferric chloride. After leaching is completed, the resultant products are subjected to filtration step 10 which separates a filtrate 13 from an insoluble residue which after washing 11 is a TiO$_2$-rutile 12. The TiO$_2$ 12 consists of at least 95% by weight of rutile-TiO$_2$.

The filtrate 13 from filtration step 10 consists of a ferrous chloride solution FeCl$_2$ solution. Solution 13 is oxidized by oxygen 14 during oxidation step 15. The products of the oxidation step 15 are then subjected to separation step 16 yielding a ferric chloride 8 liquid and a iron oxide hydrate Fe$_2$O$_3$ solid 17. The latter is of suitable purity, after washing, for use in the manufacture of pigments or for ferrites for the communications industry.

The non-magnetic fraction 6 from magnetic separation 5 consists primarily of CaS 20. The CaS is treated into a reaction vessel 22 with hydrochloric acid solution 21. Hydrogen sulfide gas 23 is generated and is subjected in an air oxidation step 25 to yield elemental sulfur 26. The residue in reaction vessel 22 consists of a liquid and precipitated solids. These are separated in filtration step 27. The filtrate consists of calcium chloride solution 28 and solid gangue 29. The gangue 29 consists of the oxides, sulfides and insoluble chlorides of the various impurities associated with and present in the ilmenite ore 1.

It can thus be seen that this aspect of the invention as shown in the flow sheet of FIG. 1 provides a high grade titanium dioxide 12 in rutile form, iron oxide hydrates 17 in pure form and calcium chloride solutions as well as elemental sulphur. The ferric chloride leach solution 8 is regenerated during this process and can be reused.

EXAMPLE 2

Figure 2:
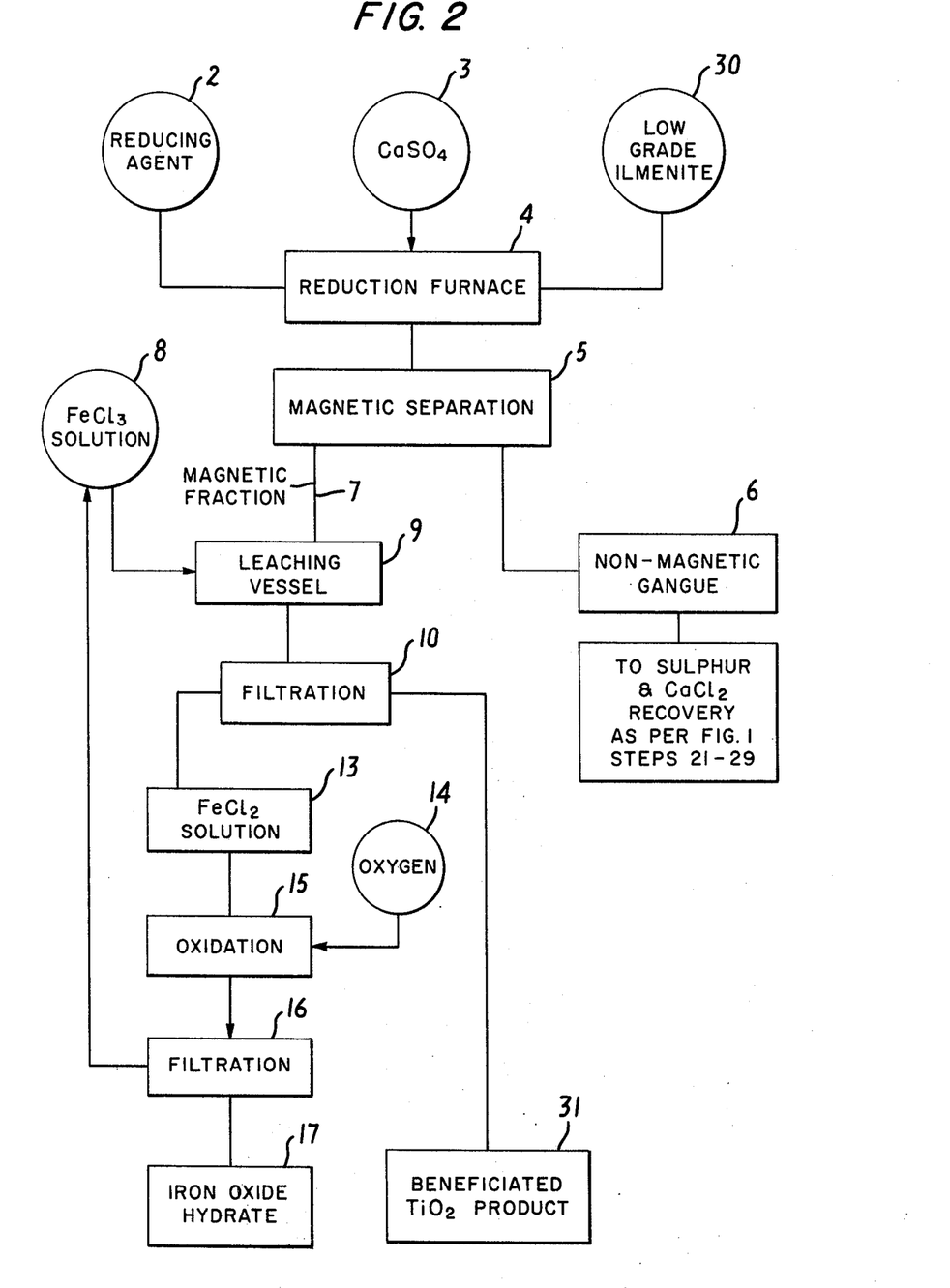
FIG. 2 is the flow sheeet of that aspect of the invention providing a highly beneficiated $TiO_2$ product from low grade ilmenite.

FIG. 2 is exemplary of that aspect of the present invention wherein a low grade ilmenite ore is reduced in the presence of calcium sulphate to provide a beneficiated TiO$_2$ product having approximately 75 to 85% TiO$_2$ content. According to this process, low grade ilmenite ore 30 having TiO$_2$ equivalent contents of less than 50 wt % TiO$_2$ and iron contents of in excess of 30 wt percent iron as iron oxides is admixed with a molecular equivalent of calcium sulphate 3 and is introduced into reduction furnace 4. The amount of calcium sulphate 3 is proportioned upon the TiO$_2$ assay of the low grade ilmenite 30. The mixture is fed into reduction vessel 4 and the reducing agent 2, preferably hydrogen, is introduced therein after the vessel has achieved reaction temperature of at least 1500° F. Heating is continued to 1700° F. After completion of the reduction reaction within about 1 hour, the reduced product is subjected to a magnetic separation step 5 to separate the non-magnetic fraction 6 from the magnetic fraction 7. The non-magnetic fraction 6 may be directly discarded or it may be treated to recover sulphur and calcium chloride as per steps 21 – 29 according to the flow sheet of FIG. 1.

After magnetic separation 5, magnetic fraction 7 is treated with ferric chloride solution 8 in a leaching step 9. After leaching the products are subjected to separation by filtration step 10 to yield a solid residue of a beneficiated $TiO_2$ product 31, and a liquid filtrate consisting of a ferrous chloride solution 13. The ferrous chloride solution 13 is treated as in FIG. 1 steps 14 – 17 to regenerate ferric chloride solution 8 and to yield iron oxide hydrate 17.

It will be noted that the beneficiated product 32 of the procedure according to the aspect of the invention illustrated in FIG. 2 has a purity of 75 – 85% $TiO_2$. Generally it has been found that this beneficiated $TiO_2$ product from low grade ilmenite ores contain some iron oxides as well as silica. The latter apparently is occluded during the reduction and is adhered to the magnetic fraction. The former may be insufficiently reduced or are pyrites residues.

EXAMPLE 3

Figure 3:
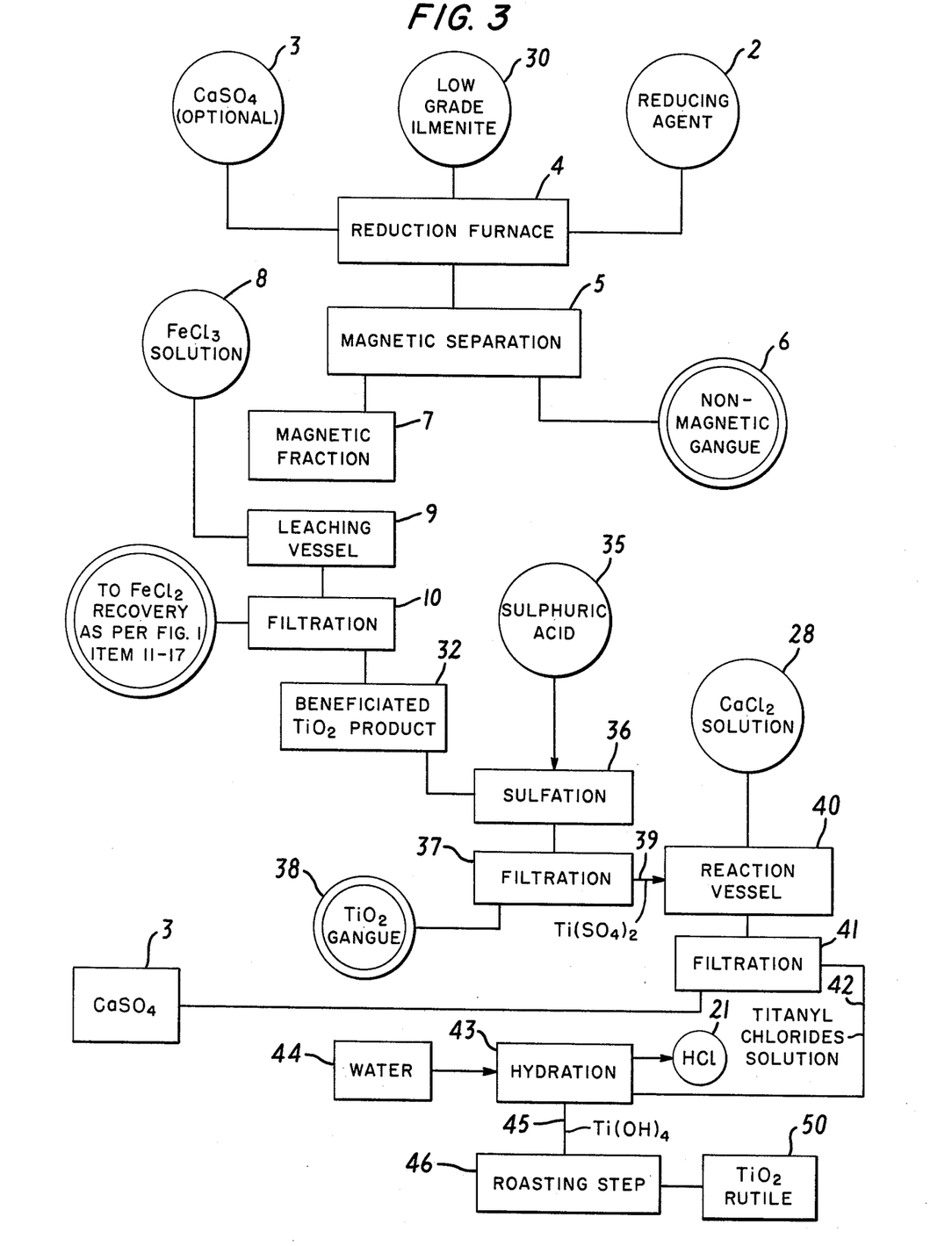
FIG. 3 is a flow sheet of the aspect according to this invention showing the preparation of a rutile-type $TiO_2$ from low grade ilmenite ores via sulphuric acid and a metathetical replacement reaction with calcium chloride to yield rutile-type $TiO_2$.

The procedures according to the flow sheet shown in FIG. 3 is exemplary of that aspect of the invention wherein a low grade ilmenite ore similar to the starting material according to the aspect illustrated in the flow sheet of FIG. 2 is first beneficiated in a procedure similar to that shown in FIG. 2 and is then further purified by a combination of sulfation and a metathetical reaction with calcium chloride to yield a rutile type $TiO_2$ having a substantial purity in excess of 98%.

Low grade ilmenite 30 as discussed above, is introduced into reduction furnace 4 at 1500° – 1700° F through which reducing agent 2 preferably hydrogen 2 is flowing. Upon completion of the reduction, the cooled material is subjected to magnetic separation step 5 to provide a non-magnetic gangue 6 and a magnetic fraction 7 which is subjected to leaching with ferric chloride 8 in leaching step 9 followed by filtration step 10 to yield a beneficiated $TiO_2$ product 32 and a ferrous chloride solution. This ferrous chloride solution is then recovered as set forth in item 11 – 17 as per FIG. 1 above.

The beneficiated $TiO_2$ product 32 is then treated with sulphuric acid 35 in sulfation step 36 to dissolve the $TiO_2$ values. Upon completion of the sulfation, the resultant material is filtered and the insoluble $TiO_2$ gangue 38 is removed leaving a titanyl sulfate solution 39. The solution 39 is introduced into reaction vessel 40 and treated with a mal-equivalent amount of calcium chloride solution 28. A metathetical reaction takes place and precipitates calcium sulphate 3 and provides a liquid solution of titanyl chlorides 42. The titanyl chlorides 42 are then subjected to hydrolysis 43 by the addition of water 44 releasing hydrochloric acid 21. Upon completion of the hydrolysis step 43, a slurry of titania hydrate 45, $(Ti(OH)_4)$ 45 is formed. This material may be directly marketed or may then be subjected to a roasting step 46 to yield rutile-$TiO_2$, 50 having a purity in excess of 98%.

As can be seen, this aspect of the invention, provides for the purification of low grade ilmenite directly to a high grade rutile product with good efficiency as most intermediate treatment agents can be recycled. The process provides additional commercially useful materials such as the iron oxide hydrate 17 which is suitable for commercial marketing to the communications industry as a ferrite raw material.

In the procedures of FIG. 3 wherein low grade ilmenite is reduced, the addition of the calcium sulphate is optional as the subsequent recovery of the large amounts of calcium sulphate may not be economically advantageous. Although, the reaction temperature during the reduction stage in 4 is lowered by the use of a $CaSO_4$, the separation of the resulting calcium sulphide from the large amounts of undesirable impurities may require greater investment in equipment than is warranted by the fuel economies resulting from the utilization of the calcium sulphate.

EXAMPLE 4

Figure 4:
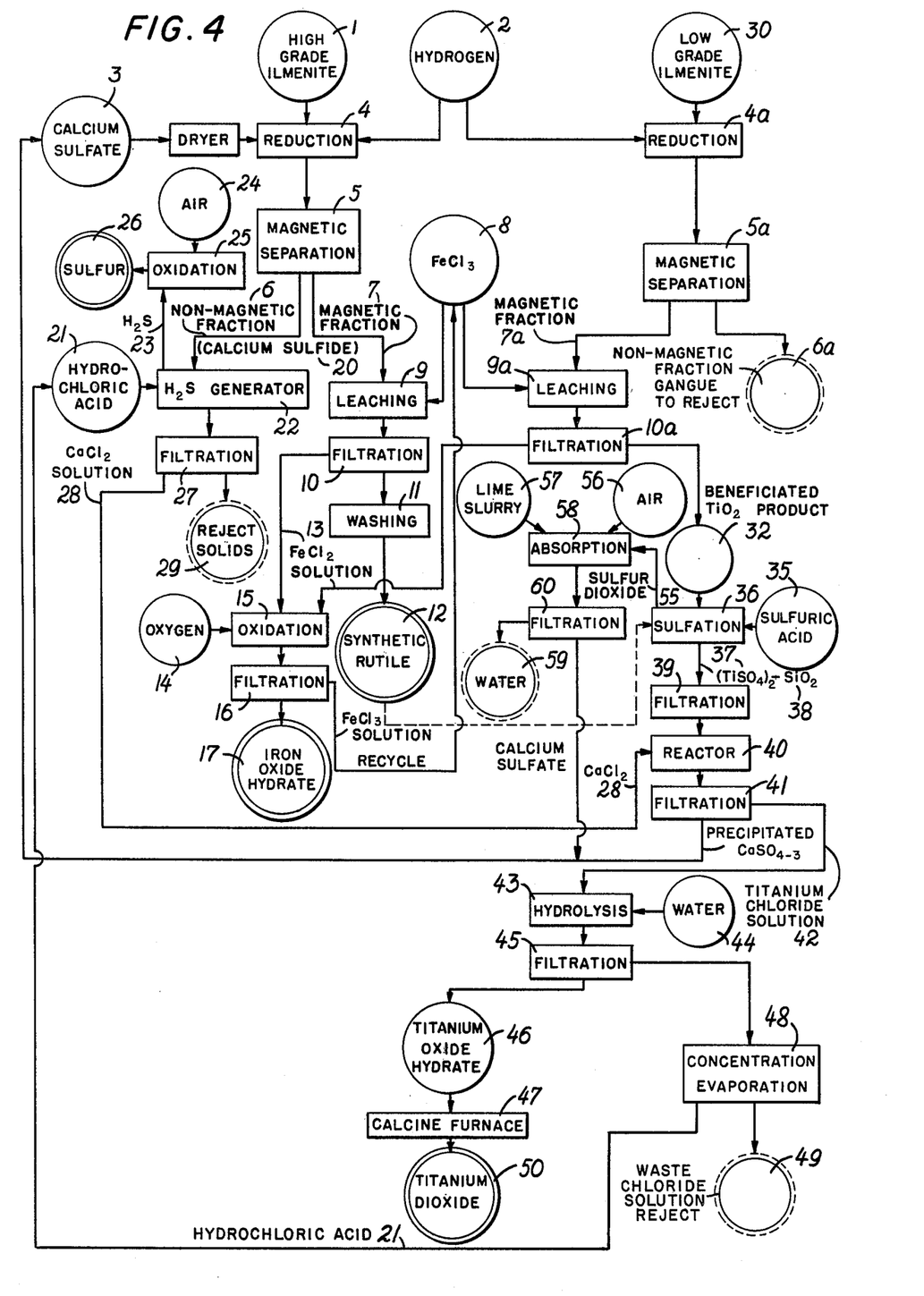
FIG. 4 is a flow sheet of the integrated process wherein both high grade and low grade ilmenite ores are processed, in parallel, to yield rutile-type $TiO_2$ wherein the processing by-products from the steps using high grade ilmenite are utilized as processing materials in the conversion of the low grade ilmenite ore.

The aspect of the invention set forth in the flow sheet of FIG. 4 is an integrated process utilizing features of this invention as set forth in FIGS. 1, 2 and 3. In this aspect of the invention, both high grade ilmenite ore and low grade ilmenite ore are processed to provide rutile type $TiO_2$ of pigment grade. The process as set forth in the flow sheet of FIG. 4 includes two separate and independent reductions. The first reduction, of high grade ilmenite ore 1 by hydrogen 2 in the presence of calcium sulphate 3 takes place in reduction vessel 4. This reduction is completed in several minutes at 1700° F and the reduced material after cooling is subjected to magnetic separation by magnetic separation means 5 to provide non-magnetic fraction 6 and magnetic fraction 7.

Magnetic fraction 7 is then leached with ferric chloride solution 8 of approximately 10% iron content as $FeCl_3$. The fraction 7 is leached by solution 8 in vessel 9 until all of the iron content from the ilmenite is dissolved by the solution. As a result of the solubilizing reaction, the ferric chloride solution 8 is reduced to form ferrous chloride ($FeCl_2$) solution 14. The leached material is separated by filtration step 10 and the residual insolubles are washed in washing stage 11 to yield the synthetic rutile 12 having a purity in the range of 95% rutile-$TiO_2$. This may all be marketed or a portion may then subsequently be introduced into the sulphation reaction step 36 as set forth herein below.

Ferrous chloride solution 13 is treated with a source of oxygen 14 in oxidation vessel 15 to regenerate the ferric chloride solution and to precipitate iron oxide hydrate. The iron oxide hydrate 17 is separated from the regenerated ferric chloride solution 8 by filtration step 16. The regenerated ferric chloride solution 8 is then recycled to a suitable storage vessel which provides the source for ferric chloride solution 8 used in leaching. The iron oxide hydrate precipitate is in substantially pure form.

The non-magnetic fraction 6 from the magnetic separation 5 comprises primarily calcium sulphide and various non-reduceable oxides and sulphides of contaminating metals. The calcium sulphide 20 admixed with the other impurities is introduced into $H_2S$ generator 22 where it is treated with hydrochloride acid to liberate gaseous $H_2S$ 23. The $H_2S$ is oxidized by air 24 in chamber 25 to yield elemental sulphur 26. The non-gaseous residue in generator 22 is filtered to separate the solid impurities as a gangue-consisting of insoluble oxides, sulphides and chlorides of the contaminating elements. The calcium sulphide is converted by reaction with hydrochloric acid in generator 22 to form a calcium chloride solution 28 to be utilized as set forth below.

In another reduction vessel 4a, low grade ilmenite ore 30 is reduced with hydrogen 2 at about 1500° – 1800° F. After about 1 hour the reduction is substantially complete and the reduced material is subjected to a magnetic separation by separation means 5a into a magnetic fraction 7a and a non-magnetic fraction 6a. Non-magnetic fraction 6a is a reject gangue of the contaminant minerals normally associated with ilmenite. The magnetic fraction 7a is then subjected, in leaching vessel 9a, to ferric chloride solution 8. After filtration at 10a, the resultant ferrous chloride solution which has leached all of the iron content from the reduced low grade ilmenite is subjected to a regeneration treatment by oxidation in vessel 15 by oxygen 14 as set forth in items 14 – 17 above.

The insoluble residue from the leaching step 9a consists of a beneficiated $TiO_2$ product 32 of about 80% purity. It is treated with sulphuric acid 35 in sulfation vessel 36. Into sulfation vessel 36 may also be introduced, for further purification, the synthetic rutile 12 of 95% purity from the leaching of the high grade ore. The sulfation products consist of dissolved titanyl sulphates 37 and insoluble silica ($SiO_2$) 38. These are separated by filtration step 39. The titanyl sulphate 37 is fed into reactor 40 into which is also introduced an equivalent amount of calcium chloride solution 28. In reactor 40 a metathetical reaction takes place. Soluble titanyl chlorides 42 are formed and insoluble calcium sulphate 3 is precipitated. These products are separated by filtration step 41. The precipitated calcium sulphate 3 is dried and may then be used in connection with the reduction of the high grade ilmenite 4. The titanyl chloride solution 42 is admixed with water 44 in hydrolysis vessel 43. As a result of hydrolysis the titanyl values are precipitated as a titanium oxide hydrate 46. After filtration the residue solution contains hydrochloric acid and such non-soluble chloride impurities such as magnesium chloride and any excess of calcium chloride. These are concentrated by heat in vessel 48. The gaseous hydrochloric acid 21 is recovered and recycled to $H_2S$ re-generator step 22. The soluble chloride wastes are discarded. These latter wastes are soluble and compatible with sea water. They may safely be disposed into the ocean. The titanium oxide hydrate 46 is then calcined in furnace 47 to yield pure rutile type titanium dioxide of a purity in excess of 98%.

The sulphur dioxide which is released during sulfation process 36 is vented via sulphur dioxide vent 55 which leads to absorption vessel 58 wherein it is combined with a lime slurry 57 and subjected to oxidation by air 56. As a result of this oxidation, an insoluble calcium sulphate slurry forms. In filtration step 56 the water 59 is separated from the slurry leaving a calcium sulphate residue which can then be safely admixed with or utilized as calcium sulphate 3 for use in the reduction 4 of the high quality ilmenite 1.

As discussed in conjunction with FIG. 3, the low quality ilmenite is not mixed with the calcium sulphate during its reduction for economic reasons. However, under certain circumstances wherein the cost of the sulphuric, hydrochloric acids and the calcium sulphates are sufficiently low and/or the non-magnetic impurities are of sufficient economic interest for further processing, the calcium sulphate may be introduced into the reduction step 4a for the low quality ilmenite 30 reduction. Under such circumstances, the non-magnetic fraction 6a may then be further treated as in step 6, 20 – 29 as described herein above for FIG. 1.

The above descriptions take in conjunction with the flow sheets of FIGS. 1 – 4 are exemplary of preferred modes for carrying out each of the aspects of the present invention. It is of course evident that the modes of FIGS. 1 and 3 are combined in the procedure as set forth in the flow sheet of FIG. 4. It will also be apparent that all of the by-products resulting from the various steps of the aspect for the purification of the high grade ilmenite and the aspect for the treatment of the low grade ilmenite as shown in Example 3 are combined inasmuch as the by-products from each individual process of recycled to the other process. For example, the calcium sulphate from the sulfation procedure is recycled to catalyze the reduction of the high grade ilmenite ore. The calcium chloride resulting from the calcium sulphide by-product treatment for the high quality ilmenite is used in the metathetical precipitation reaction to transform the titanyl sulphate to the titanyl chloride. Such a balancing of procedures and materials results in marked economic advantage for the combined and integrated process as set forth in FIG. 4.

What is claimed is:

1. The method for the production of titanium dioxide in rutile form from ilmenite which comprises the steps of:
   a. mixing ilmenite ore with calcium sulfate in a proportion of 1:10 to 10:1;
   b. heating said mixture with hydrogen at temperatures in the range 1500° to 1800° F for up to 1 hour to reduce the iron in the ilmenite ore to metallic iron and the calcium sulfate to calcium sulfide;
   c. magnetically separating the reduced mixture to form a magnetic fraction containing the iron and the $TiO_2$ content of the ores, and a non-magnetic fraction comprising the calcium sulfide and non-$TiO_2$ gangue, and segregating the non-magnetic fraction;
   d. leaching said magnetic fraction with a ferric chloride solution thus dissolving said metallic iron and filtering the leached fraction leaving the $TiO_2$-components as a residue;
   e. dissolving the $TiO_2$ residue in concentrated sulfuric acid to form a titanyl sulfate solution thereof;
   f. adding at least one mole equivalent of calcium chloride solution to said titanyl sulfate solution to form a solution of titanyl chloride and a precipitate of insoluble calcium sulfate;
   g. separating said insoluble calcium sulfate precipitate from said titanyl chloride solution;
   h. hydrolyzing said titanyl chloride solution by the addition of water and heat, thus precipitating titanium oxide hydrate and liberating gaseous hydrochloric acid;
   i. calcining said titanium oxide hydrate to form $TiO_2$ in rutile form;
   j. recycling the liberated hydrochloric acid from (h) to react with the calcium sulfide of the non-magnetic fraction obtained at (c) to form the calcium chloride used in step (f);
   k. recycling the calcium sulfate precipitate, separated at (h), to mix with fresh ilmenite at (a);
   l. oxidizing the leached iron-containing solution with an oxygen-containing gas to precipitate iron oxide ($Fe_2O_3$) from said solution and regenerating ferric chloride solution for use in step (d).

* * * * *